United States Patent [19]

Fukui et al.

[11] 4,103,221

[45] Jul. 25, 1978

[54] INDUCTOR WITH PLURALITY OF MAGNET PIECES IN AIR GAP

[75] Inventors: Masahiko Fukui, Kumagaya; Hiromi Sako, Fukaya; Masao Ogata, Kumagaya, all of Japan

[73] Assignee: Hitachi Metals, Ltd., Tokyo, Japan

[21] Appl. No.: 680,539

[22] Filed: Apr. 26, 1976

Related U.S. Application Data

[63] Continuation-in-part of Ser. No. 471,157, May 17, 1974, Pat. No. 3,968,465.

[30] Foreign Application Priority Data

| May 18, 1973 | [JP] | Japan | 48/54624 |
| Jul. 23, 1973 | [JP] | Japan | 48/80924 |
| Jul. 23, 1973 | [JP] | Japan | 48/80925 |
| Jul. 20, 1973 | [JP] | Japan | 48/80588 |
| Jan. 30, 1974 | [JP] | Japan | 49/12060 |
| Feb. 22, 1974 | [JP] | Japan | 49/20817 |

[51] Int. Cl.² .................. G05F 1/22; H01F 21/00
[52] U.S. Cl. .................. 323/92; 323/89 AG
[58] Field of Search ............ 336/110, 155, 160, 165, 336/178; 323/92, 89 AG

[56] References Cited

U.S. PATENT DOCUMENTS

| 378,320 | 2/1888 | Kennedy | 323/92 |
| 2,854,607 | 9/1958 | Niklas et al. | 336/110 |
| 3,209,295 | 9/1965 | Baermann | 336/110 |
| 3,368,141 | 2/1968 | Subieta-Garron | 323/92 |
| 3,519,918 | 7/1970 | Bruck | 336/110 |
| 3,671,810 | 6/1972 | Barnes et al. | 323/92 |
| 4,009,460 | 2/1977 | Fukui et al. | 336/110 |

Primary Examiner—Gerald Goldberg
Attorney, Agent, or Firm—Birch, Stewart, Kolasch & Birch

[57] ABSTRACT

There is provided a gap in a magnetic circuit of an iron core inductor, and a plurality of small size permanent magnet pieces are placed in the aforesaid gap, with the magnetizing directions thereof being provided in side-by-side relation. If the magnetizing direction of the permanent magnet pieces is opposed to that of a D.C. magnetic field which is produced in a magnetic circuit, yet in case D.C. and A.C. overlapping currents flow through the inductor, then the D.C. magnetic field produced in the magnetic circuit will be off-set thereby, providing a high inductance value, while eddy currents produced within the permanent magnet pieces due to the A.C. magnetic field will be reduced to a considerable amount, because the permanent magnet pieces are small in size, thus minimizing the heat to be produced in the permanent magnet pieces.

5 Claims, 15 Drawing Figures

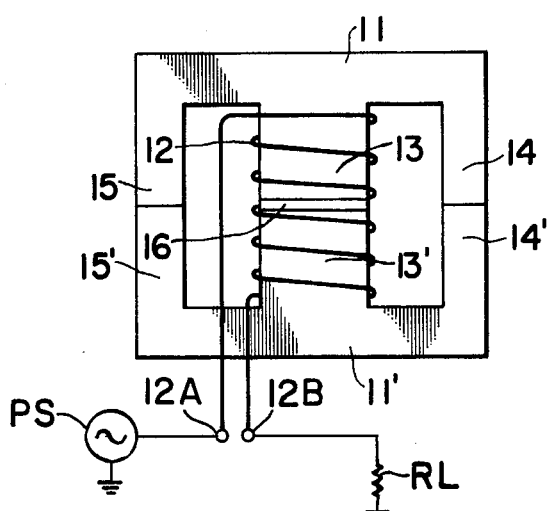
FIG. 1
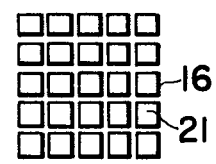
FIG. 2
FIG. 3
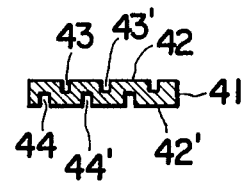
FIG. 4
FIG. 5
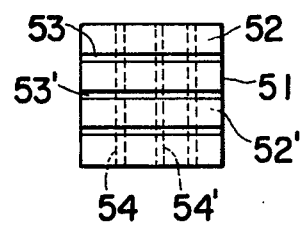
FIG. 6
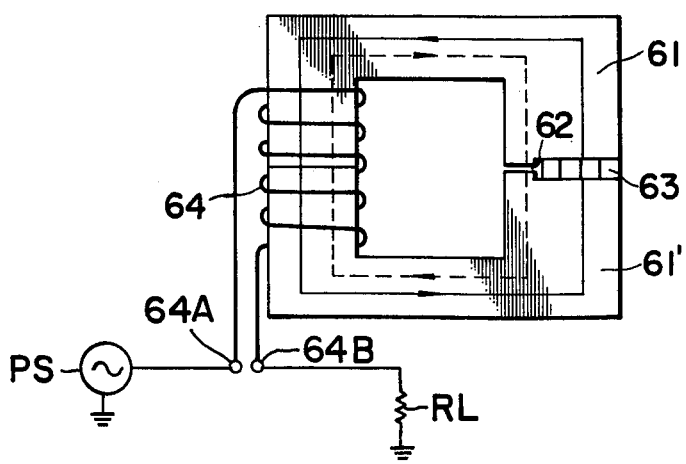

INDUCTOR WITH PLURALITY OF MAGNET PIECES IN AIR GAP

BACKGROUND OF THE INVENTION

This is a continuation-in-part of application Ser. No. 471,157, filed May 17, 1974 now U.S. Pat. No. 3,968,465.

This invention relates to an inductor consisting of such an iron core made of a soft magnetic material, which serves as a magnetic circuit, around which is wound a coil, and more particularly to an inductor having a permanent magnet in part of the magnetic circuit thereof.

With an inductor for use in an electric circuit, through which overlapping A.C. and D.C. currents flow, as in the case with a choke coil, the iron core of the inductor is brought to a magnetic saturation due to D.C. electric current. For this reason, extremely low permeability of the iron core will result, and thus effective inductance of an inductor will be lowered.

To avoid this shortcoming experienced with the prior art inductor for use in an electric circuit, through which a great amount of D.C. current flows, there has been proposed a method to avoid the magnetic saturation of the iron core by providing a gap in part of the magnetic circuit thereof. However, the provision of a gap in part of the magnetic circuit will lead to the lowered permeability of the entire iron core which, in turn, results in lowered inductance of an inductor.

Another attempt to avoid the magnetic saturation in the iron core accruing from the D.C. current, which flows through an inductor, is that there is inserted in part of the magnetic circuit a permanent magnet having a magnetic field of an intensity of the same level as that of the D.C. magnetic field, with the direction of the magnetic field thereof being opposed to that of the D.C. magnetic field induced within the iron core due to a D.C. current. With the inductor of the aforesaid arrangement, the D.C. magnetic field induced within the iron core due to the D.C. current is off-set by the magnetic field produced by a permanent magnet, whereby there will not arise the magnetic saturation in the iron core made of a soft magnetic material.

This permits the iron core to operate at an extremely high level of permeability for an A.C. current, thereby providing a high inductance.

On the other hand, since not only the D.C. magnetic field but an A.C. magnetic field are applied to the iron core of an inductor at the same time, materials having as high a specific resistance as possible are used as an iron core of a soft magnetic material, for instance, soft ferrites such as Mn—Zn ferrite and Ni—Zn ferrite and the like. The specific resistances of those materials are no less than $10^2 \Omega m$. For the same reason, a hard ferrite magnet having a specific resistance of no less than $10^2 \Omega m$, such as for instance, a Ba-ferrite magnet is used as permanent magnet to be inserted in part of the iron core of a soft magnetic material, of the inductor.

The coercive force of the hard ferrite magnet ranges from 2000 to 4000 oersted which is greater as compared with that an Alnico magnet, such that there will not be caused demagnetization by the use of the hard ferrite magnet for a portion, where A.C. magnetic field of a high level as well as a D.C. magnetic field having an opposed magnetizing direction are simultaneously applied as in the case with an iron core of an inductor.

On the other hand, the residual flux density of the hard ferrite magnet, as well known, is 3000 to 4000 gauss. Thus, the residual flux density thereof is half or one third as much as that of a metal magnet such as Alnico magnet. Accordingly, the use of the hard ferrite magnet as a biasing magnetic field source of an inductor is limited to the case where the D.C. component of the electric current is relatively small in amount. On the other hand, in case a D.C. component is relatively great, the D.C. magnetic field induced by the D.C. current will be much greater than that produced by the hard ferrite magnet, with the result that inductance of an inductor for the A.C. current will be lowered. For providing a higher level of biasing magnetic field by using an inductor which incorporates a hard ferrite magnet as a biasing magnetic field, it is required to use a magnet having a larger magnetic pole area. The use of a magnet having a larger magnetic pole area then dictates the use of a magnet of an increased length for avoiding demagnetization due to the demagnetizing field. (The thickness of the inserted magnet with respect to a direction of the magnetic circuit should be increased.) As has been described, with an inductor using as a biasing magnetic field a hard ferrite magnet which is inserted in part of a magnetic field, the size of the inductor should be increased, when an electric current having a great amount of D.C. current component is to flow therethrough.

SUMMARY OF THE INVENTION

It is accordingly a principal object of the present invention to provide an inductor which is provided with a magnetic field, in part of which is inserted a metallic permanent magnet as a biasing magnetic field.

It is another object of the present invention to provide an inductor which minimizes the heat produced within a metallic permanent magnet used as a biasing field, even for a A.C. current having a high frequency.

It is a further object of the invention to provide an inductor which uses as a biasing magnetic field a magnetic permanent magnet having an excellent or desired magnetic characteristic, residual flux density, coercive force and the like, such as for instance, platinum-cobalt magnet or rare earth-cobalt magnet.

It is a further object of the invention to provide an inductor which provides an inductance of a sufficient level, even in case the D.C. current of an extremely great amount flows through an electric circuit, through which overlapping A.C. and D.C. currents flow.

It is yet a further object of the invention to provide an inductor which prevents demagnetization of a permanent magnet used as a biasing magnet field, even when an impulse current such as a surge current flows through an inductor and which prevents no variation in inductance.

BRIEF DESCRIPTION OF THE DRAWINGS

FIG. 1 is a plan view of an inductor of a construction wherein a biasing permanent magnet is inserted in a gap defined in part of a magnet circuit;

FIG. 2 is a plan view of a plurality of permanent magnet pieces arranged in a flat plane, which magnets are adapted for use in an inductor according to the present invention;

FIG. 3 is an explanatory view for use in calculating eddy current loss in a permanent magnet plate;

FIG. 4 is a cross-sectional view of one embodiment of a permanent magnet used in an inductor according to the present invention;

FIG. 5 is a plan view of another embodiment of a permanent magnet for use in an inductor according to the present invention;

FIGS. 6, 7 and 9 are front views of embodiments of an inductor according to the present invention, respectively;

DETAILED DESCRIPTION OF THE INVENTION

Figure 2A:
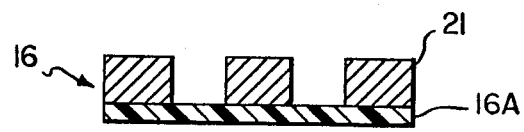
FIG. 2A is a side elevational view in section of a further embodiment of the arrangement of the plurality of magnet pieces disposed in the gap of FIG. 1.

These features of the inductor according to the present invention will be described in more detail hereunder, in which a plurality of discrete permanent magnet pieces are located in a gap provided in an iron core made of a soft magnetic material and forming a magnetic circuit, around which is wound a coil. The inductor is connected between a current source of a power supply and a load and is used for smoothing D.C. and A.C. overlapping currents passing through the coil wound on the magnetic circuit.

FIG. 1 shows a front view of one embodiment of an inductor. Shown at 11, 11' are an E-type iron core made of a soft magnetic material, at 12 a coil which is wound around the central leg 13 and outer legs 14 and 15. The E-type iron coil 11' has a central leg 13' and outer legs 14', 15'. The central legs 13, 13' are shorter than the outer legs 14, 15, 14', 15', respectively, such that when the E-type iron cores 11 and 11' are assembled together in abutting relation to each other, then there will be provided a gap between the opposing end faces of the central legs 13 and 13'. A plate-form permanent magnet 16 is inserted in this gap. D.C. and A.C. overlapping currents flow through a coil 12 wound around central legs 13 and 13', continuously. It is designed that a D.C. magnetic field produced within the central legs 13 and 13' and the intensity of magnetization of the permanent magnet 16 have the opposite direction and provide substantially the same level. According to the present invention, the plate-form permanent magnet 16 is divided into a plurality of small-size magnet pieces 21, as shown in FIG. 2 (25 in number in the drawing), with the magnetizing directions thereof being provided in side-by-side relation.

The heat to be produced within the permanent magnet 16 due to an A.C. current flowing through the coil of an inductor will be expressed as follows:

Assume that the permanent magnet 16, as shown in FIG. 3, is of a plate having an area of S m$^2$, and of a square shape having one side of a length of $\sqrt{S}$ m and a thickness of a m. Further assume that an A.C. current flowing through the coil produces uniform A.C. magnetic field running through the permanent magnet 16 in a direction perpendicular to the surface of the plate 16. The A.C. magnetic field is expressed by the following formula:

$$B = B_m \cos 2\pi f t$$

wherein $B_m$ (Wb/m$^2$), $f$(Hz) and $t$(sec) represents a maximum value of magnetic flux density, a frequency and a time.

The effective value of an electromotive force induced at the minute portion 3 having a minute width dx, in the permanent magnet 16, is expressed as follows:

$$E \text{ (volt)} = \sqrt{2} \, \pi f B_m (2x)^2$$

Assume of specific resistance of permanent magnet 16 of $\rho \Omega$m, then the circuit resistance R of the minute portion 3 will be expressed as follows:

$$R(\Omega) = \rho \frac{8x}{a \cdot dx}$$

Accordingly, the power loss dp produced at the minute portion 3 will be such as:

$$dp \text{ (watt)} = \frac{E^2}{R} = \frac{4\pi^2 f^2 B_m^2 a x^3 \, dx}{\rho}$$

The power loss P produced in the permanent magnet in its entirety will be as follows:

$$P \text{ (watt)} = \int_0^{\frac{\sqrt{s}}{2}} dP = \frac{\pi^2 f^2 B_m^2 a S^2}{16 \rho}$$

The above formula may be expressed as follows:

$$P = K \cdot S^2,$$

wherein $$\text{wherein } k = \frac{\pi^2 f^2 B_m^2 a}{16 \rho}$$

As is apparent from the foregoing, the power loss produced in the biasing permanent magnet 16 is in proportion to the square of the cross sectional area S. As is the case with the present invention, in case a permanent magnet is divided into sections of 'N' in number, then the respective areas of the discrete magnet pieces will be S/N m$^2$. Thus, the power loss in the respective magnet pieces, i.e., the eddy current loss $\Delta P = k \cdot (S/N)^2$.

The total power loss of the discrete magnet pieces will be N·$\Delta$P. This value is $k \cdot S^2/N$ which is reduced to 1/N, as compared with the loss P= k · S$^2$ prior to division of the magnet.

As is clear from the foregoing, the inductor according to the present invention which uses discrete permanent magnet pieces as a biasing permanent magnet permits to minimize the eddy current loss within the biasing permanent magnet due to such an A.C. magnetic field within an iron core, which is induced by the coil, thereby preventing the heat produced in the permanent magnet.

Even in case a metallic magnet having a high electric conductivity, such as case Alnico magnet, sintered Alnico magnet, rare earth cobalt magnet, etc. is used as a biasing permanent magnet, the magnet divided into small discrete magnets and incorporated in the magnetic circuit will minimize the eddy current loss caused due to an A.C. magnetic field and hence the heat in the magnet.

Since those metallic magnets have excellent magnetic characteristics and produce a high biasing magnetic field in an iron core of an inductor, they can off-set D.C. magnetic field produced by a great amount of D.C. current flowing through the coil in overlapping manner, thus aiding in the conductor exhibiting excellent characteristics.

Now, description will be given on the method for producing an inductor according to the present invention. For the production of the inductor, the magnetizing directions of a plurality of discrete magnet pieces should be arranged in side-by-side relation, before a plurality of divided permanent magnet pieces are inserted in the gap defined between the iron cores of the inductor. However, difficulties arise in arranging the magnetizing directions of discrete magnet pieces, because there will arise repulsion between the discrete magnet pieces having the same polarity, due to the proximity of those magnet pieces, with the result that those magnet pieces cannot be set within a given area or are apt to be superposed one on top of another, thus failing to be arranged in order without interstice between adjacent magnetic pieces.

One embodiment of the method for producing an inductor according to the present invention will be described with reference to an inductor provided with a E-type iron core having a magnetic circuit as shown in FIG. 1, wherein there is provided a gap between the end faces of the central legs 13 and 13'. An adhesive is applied to the end face of the central leg 13' of the E-type iron core 11', and then a plurality of permanent magnets, such as small size magnet pieces 21 as shown in FIG. 2 are placed in side-by-side relation on the end face thus prepared. Then, the E-type iron core 11 on one side is assembled to the iron core 11', with the permanent magnet pieces thus placed being interposed between the end face of the central leg 13 of the iron core 11 and the end face of the central leg 13'. Finally, a coil 12 is wound therearound to provide an inductor. The coil 12 has terminals 12A and 12B connected in series between power source PS and load RL, respectively. In this manner, the respective permanent magnet pieces may be fixedly attached in the gap defined between the legs 13 and 13' by using an adhesion force of the adhesive which overcomes a repulsion force of the respective magnetic poles, thus facilitating assembly of an inductor. The adhesive as used herein should preferably be of an epoxy type having a high viscosity, because the adhesive of high viscosity permits ready assembly, even immediately before solidification of the adhesive. Furthermore, the step of placing the respective permanent magnet pieces on the layer of the adhesive permits the adhesive to make ingress into interstices among the respective permanent magnet pieces, thus preventing the flowing of an eddy current produced within the respective permanent magnet pieces into other permanent magnet pieces, thus further minimizing the eddy current loss.

Another embodiment of the method for producing an inductor according to the present invention is as illustrated in FIG. 2A. An adhesive is applied on the surface of a sheet 16A having an electrically insulating property, and then a plurality of permanent magnet pieces 21 are placed in order to thereby be bonded to the surface of the sheet in an integral fashion, after which the sheet 16A thus prepared is inserted in a gap such as that illustrated in FIG. 1 provided in the magnetic circuit, and then a coil is wound around the magnetic circuit to provide an inductor. This method permits ready assembly, with the feasibility of efficient mass production.

A further embodiment of the method for producing the inductor according to the present invention is that a plurality of permanent magnet pieces are placed in a flat plane, with the magnetic poles thereof being arranged in the same direction, then resin is poured thereon in a mold, after which the adhesive attaching to the magnetic pole surfaces of the permanent magnet pieces is removed. Finally, a plurality of magnet pieces thus prepared are inserted in a gap in a magnetic circuit. This type of a method facilitates assembly, while eliminating magnetic leakage, because the magnetic pole surfaces of the respective permanent magnet pieces contact directly the end faces of the leg portions of the iron cores.

Figure 2B:
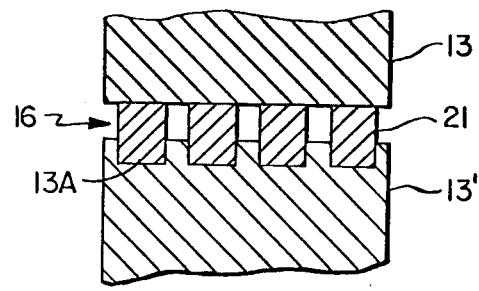
FIG. 2B is a side elevational view in section of still a further embodiment of the arrangement of the plurality of magnet pieces in a gap such as FIG. 1.

A still further embodiment of the method for producing an inductor according to the present invention is as illustrated in FIG. 2B.

There is provided a plurality of recesses portions 13A in both or either of the end faces of the legs 13, 13' of the iron cores which end faces are placed in opposing relation to each other with a gap being interposed therebetween. In this respect, the depths of the respective recessed portions would be smaller in dimension than the thickness of the permanent magnet pieces. Then, the respective permanent magnet pieces 21 are placed in the aforesaid respective recessed portions, with the magnetic poles being arranged in the same direction. This type of method permits to place the magnets having magnetic poles of the same direction in a plane, simply by placing the respective permanent magnet pieces in the respective recessed portions, resulting in ready assembly of iron cores. In addition, since the gap length in the iron cores is smaller in dimension than the thickness of the permanent magnet pieces (i.e. the length of the permanent magnet piece in a direction of a magnetic pole), the magnetic flux will be produced so as to run through the gap between the iron cores rather than through the permanent magnet pieces, even if a great amount of D.C. impulse current flows through the inductor, such that demagnetization of the permanent magnet pieces may be prevented, thus presenting a consistent inductance.

A yet further embodiment of the method for producing an inductor according to the present invention is as follows:

A plurality of permanent magnet pieces are placed on the end face of one of the legs of iron cores, and then the other magnetic core is placed so as to abut the aforesaid permanent magnet pieces are fixed in position by means applied from outer circumference of the permanent magnet pieces, followed by magnetization. This type of method permits the orderly arrangement of the permanent magnet pieces on the end faces of the legs of the iron cores without considering the directions of the magnetic poles of the respective magnet pieces, thus facilitating assembly of an inductor.

A further embodiment of the method for producing an inductor according to the present invention is that a plurality of grooves are provided in the top and back surfaces of a permanent magnet plate which has been magnetized in a direction perpendicular to the surface of the plate, and then the permanent magnet plate is inserted in a gap defined in the magnetic circuit. Then, a coil is wound around the magnetic circuit to complete the assembly of an inductor.

More particularly, as shown in the cross sectional view in FIG. 4, a permanent magnet plate 41 is magnetized in a direction perpendicular to the plate surfaces 42 and 42', while grooves 43 and 43' . . . are provided in the surface 42, and grooves 44, 44' . . . are provided in the back surface 42'. In case the permanent magnet plate 41 thus prepared is inserted in a gap defined in the magnetic circuit of an inductor, then there will be induced eddy currents in the aforesaid permanent magnet plate 41 due to an A.C. component of a current flowing through an inductor. The permanent magnet plate 41 presents a function like having a high electric resistance partially, because of the small cross sectional area of the plate 41 where the grooves 43, 43', 44, 44' are present. The eddy current thus produced is interrupted at portions of the grooves 43, 43', 44, 44', while the eddy current will flow within the small regions separated or confined by the grooves formed in the surface of the permanent magnet plate, because of the increased resistance at the aforesaid small cross sectional area portions. This then minimizes the eddy current loss to a great extent, as compared with the permanent magnet plate free of grooves, with the result of decreased heat production.

FIG. 5 is a plan view of a further embodiment, wherein there are provided a group of grooves 53, 53' . . . and another group of grooves 54, 54' in the top surface 52 of the permanent magnet plate 51 and in the back surface 52' thereof, respectively, with the directions of the aforesaid two groups of grooves being provided at a right angle to each other. This arrangement minimizes the eddy current loss to a further extent, as compared with the cas shown in FIG. 4.

A still further embodiment of the method for producing an inductor according to the present invention, wherein a plurality of permanent magnet pieces are placed in a gap formed in a magnetic circuit to thereby provide an inductor presenting magnetic biasing, is that there is provided gap in such a manner that the extent of at least part of the aforesaid gap is smaller in dimension than the thickness of the permanent magnet piece. More specifically, referring to FIG. 6, there are provided two 'U' shaped iron cores 61, 61', with their legs facing each other. In this case, there is provided a gap 62 between the opposing end faces of the legs on one side, the extent of part of the aforesaid gap 62 being less in dimension than the thickness of the permanent magnet 63. The permanent magnet 63 includes a plurality of permanent magnet pieces therein, with the direction of magnetization thereof being opposed to that of the D.C. magnetic field running through the magnetic circuit, whereby the permanent magnet 63 will function as a biasing magnetic field for the D.C. magnetic field.

A coil 64 is wound around portions of iron cores 61, 61'. Coil 64 is provided with terminals 64A, 64B connected in series between power source PS and load RL.

The magnetic flux created by the biasing magnetic field produces a sufficient biasing magnetic field, as shown by the solid line, because the magnetic flux extends through an almost closed magnetic circuit. A high level of the demagnetizing field, which is created due to flowing of an impulsive D.C. current through a coil of an inductor, runs through such a portion of the gap 62 having a smaller gap extent, as shown by the broken line having arrow marks, such that the demagnetizing field will not directly applied to the permanent magnet 63, thus preventing demagnetization of a permanent magnet, with the result that the inductance of the inductor may be stabilized.

A further embodiment of the method for producing an inductor according to the present invention is as follows: This is provided a magnetic bypass circuit between the iron cores, with a gap being interposed in one portion in the magnetic circuit between the iron cores facing each other, the aforesaid magnetic bypass circuit being made of a soft magnetic material and adapted to vary the extent of the magnetic bypass, whereby inductance of an inductor may be adjusted as required.

Figure 7:
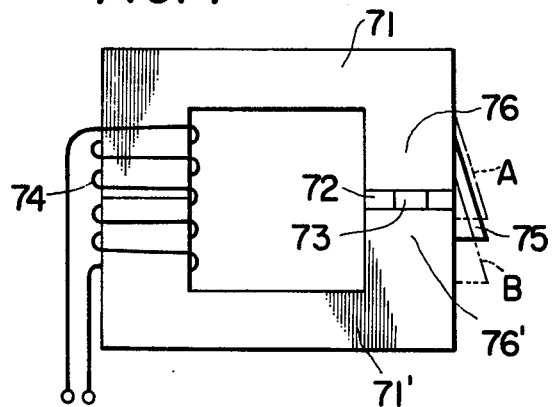
Figure 8:
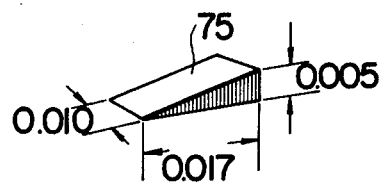
FIG. 8 is a wedge-shaped adjusting piece for use in an inductor of FIG. 7.

As shown in FIG. 7, there are provided two 'U' shaped iron cores 71 and 71', with the legs thereof facing each other. The legs on one side define a gap 72, in which there is placed a permanent magnet 73 consisting of a plurality of permanent magnet pieces. Shown at 75 is an adjusting piece of a wedge shape which is made of a soft magnetic material, which is provided on the side surfaces of the iron cores so as to magnetically shortcircuit the iron core legs 76 and 76' which face each other through the medium of the permanent magnet 73. The aforesaid wedge shaped adjusting piece 75 functions as a magnetic bypass circuit. The magnetic resistance varies depending on the set position of the wedge-shaped adjusting piece 75. When the wedge-shaped adjusting piece 75 is moved to a position shown by the one point broken line as shown in FIG. 7 (A), then the legs 76 and 76' facing each other will be magnetically shortcircuited. Accordingly, the value of the magnetic bias due to the permanent magnet will be decreased. On the other hand, when the wedge-shaped adjusting piece 75 is moved to a position shown by one point broken line in FIG. 7 (B), there will result a reduced extent of the magnetic shortcircuiting, while the magnetic flux produced in the permanent magnet 73 will run in its majority through the iron cores 71 and 71', such that the value of the magnetic bias will be greater. FIG. 8 shows one example of the wedge-shaped adjusting piece used for the inductor shown in FIG. 7. The dimension shown is given in meter.

Figure 9:
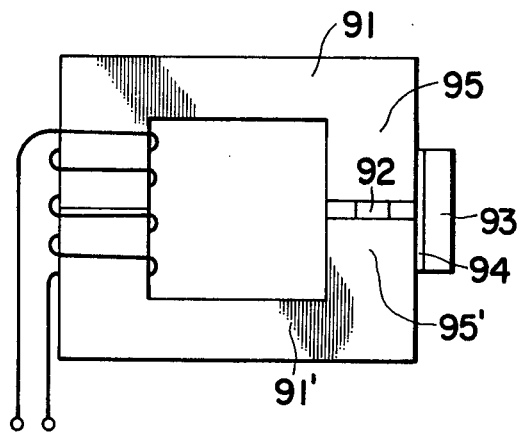

With the inductor as shown in FIG. 9, two 'U' shaped iron cores 91 and 91' are placed, with their legs facing each other, while a permanent magnet 92 consisting of a plurality of permanent magnet pieces is placed in a gap defined between the legs facing each other. A soft magnetic naterial piece 93 is provided through the medium of a non-magnetic material layer 94 on the sides of the iron cores for magnetically shortcircuiting the legs 95 and 95' of the iron cores, which face each other, with a permanent magnet 92 being interposed therebetween. In this case, the magnitude of the biasing magnetic field may be adjusted by varying the thickness of the non-magnetic layer 94.

Figure 10:
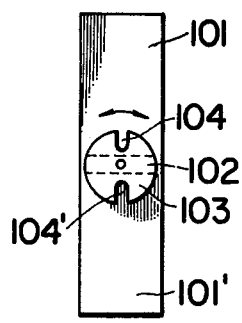
FIG. 10 is a side view of a further embodiment of an inductor according to the present invention.

With the inductor shown in FIG. 10, there is provided a disk-like soft magnetic material 103 which is adapted to shortcircuit the legs 101 and 101' of the iron cores, with the biasing permanent magnet 102 being interposed therebetween. The soft magnetic material 103 is adapted to rotate about the center of the gap defined by the legs of the iron cores, which face each other. The disk-like soft material 103 is formed with cut-away portions 104 and 104' which extend from the outer circumference of the material 103 to the center thereof, i.e., the axis of the material 103, whereby the rotation of the disk-like soft magnetic material 103 in a direction shown by an arrow will vary inductance of an inductor.

As has been described with reference to FIGS. 7 to 10 thus far, the provision of the adjustable magnetic bypass circuit for the legs of iron cores, which face each other, permits the adjustment of the magnitude of the magnetic bias caused by the permanent magnets, whereby the inductance of the inductor may be adjusted to a desired value, as required.

The following examples are illustrative of the features of the present invention, wherein numerical explanation is given.

EXAMPLE 1

Figure 11:
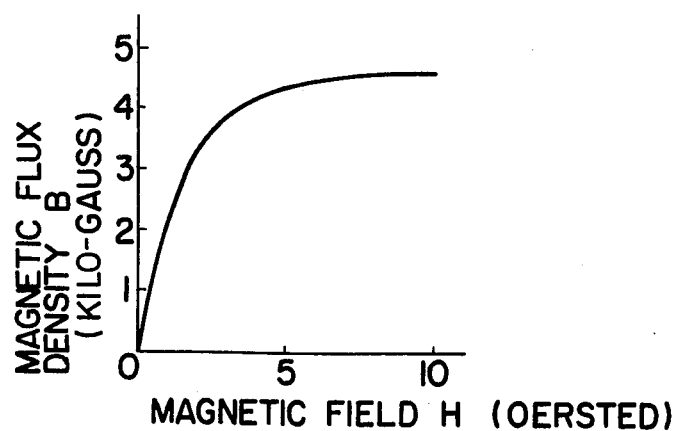
FIG. 11 shows magnetic characteristics of an iron core used in embodiments of the present invention.

Iron cores of an inductor were prepared to a shape shown in FIG. 1. The total width of the iron core was 57mm, the height thereof 48mm, the width of the central leg of the iron core 19mm, cross section of the central leg being of a square shape of 19mm × 19mm. The soft magnetic material forming the iron cores of the inductor is a soft ferrite, whose magnetic characteristics are shown in FIG. 11. Two E-type iron cores 11 and 11' define a gap therebetween, and the gap length thus defined was 0.9mm in dimension.

The permanent magnet used was of a flat plate having the magnetic pole surface of 19mm × 19mm and a thickness of 0.9mm. This permanent magnet is a rare earth - cobalt magnet providing magnetic characteristics, such as residual magnetic flux density Br=8000 gauss, coercive force Hc=8000 oersted and electric specific resistance $\delta = 5 \times 10^{-7}$ Ω·m. The aforesaid magnet of a flat plate form was divided along the magnetic pole surfaces into 25 discrete magnet pieces 21 having the same size. The aforesaid discrete magnet pieces 21 had been magnetized in a widthwise direction.

Then, 25 permanent magnet pieces 21 were placed in a gap defined between the central legs 13 and 13', with the magnetizing directions thereof being arranged in side-by-side relation and then bonded together by using an epoxy base adhesive. Then, a length of copper sheet having a width of 25mm and a thickness of 0.3mm was wound 15 turns around the central legs 13 and 13' through the medium of an insulating film to give a coil 12.

Figure 12:
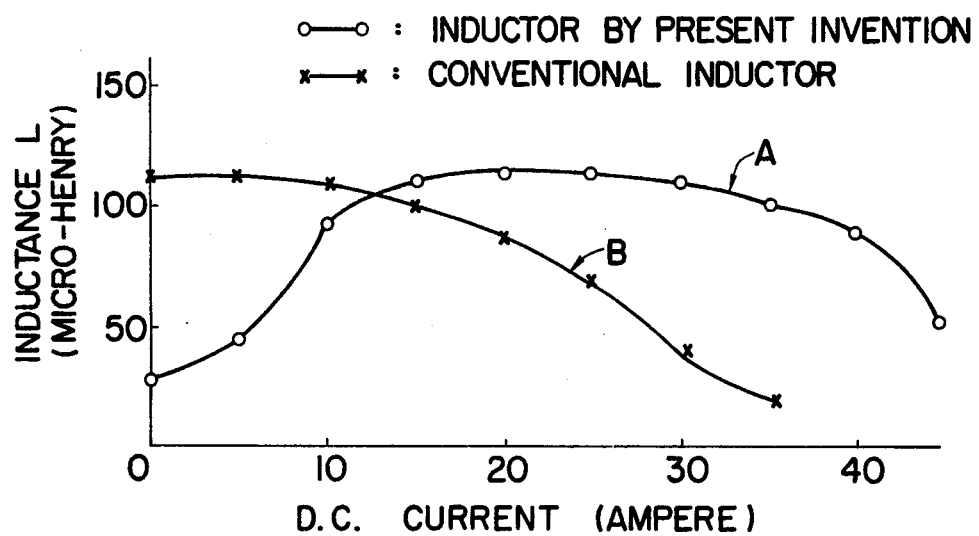
FIG. 12 is a plot showing the relationship of inductance of an embodiment of an inductor according to the present invention and that of an inductor of the prior art versus D.C. overlapping currents.

FIG. 12 (A) shows inductances, when an electric current having overlapping D.C. and A.C. components flow through the coil 12 of the inductor thus prepared. FIG. 12 is illustrative of the relationship of inductance L μH versus the D.C. overlapping current Idc ampere. FIG. 12B shows inductance of the prior art inductor for comparison purpose. In this respect, the prior art inductor has the same size as that of the embodiment of the present invention and is free of a biasing permanent magnet.

In case an electric current having an overlapping A.C. current of a frequency of 20 KHz and D.C. current of 25 amperes was caused to flow through the coil of an inductor according to the present invention, the eddy current loss in the permanent magnet portion was found to be 5.8 watt and the temperature rise was 53° C. In contrast thereto, the eddy current loss when an integral permanent magnet plate was used in the inductor shown in FIG. 1, was 145 watt, while the temperature rise was considerably high, with the result of extremely low inductance, thus failing to meet the practical use.

EXAMPLE 2

Figure 13:
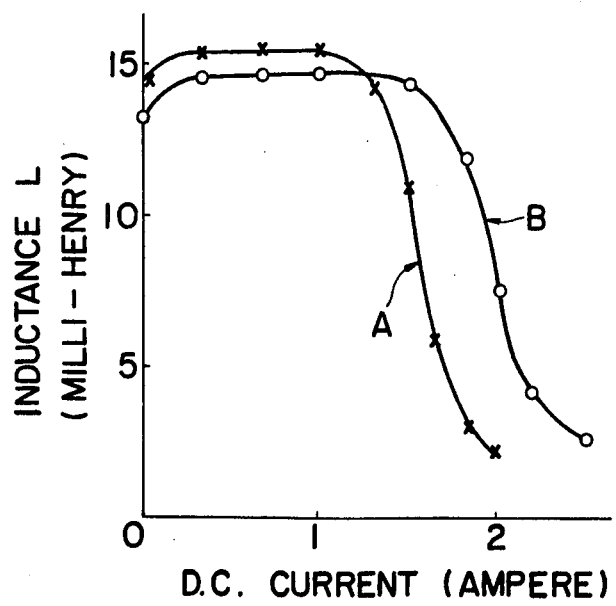
FIG. 13 is a plot illustrating the relationship between the inductance of an inductor of another embodiment of the present invention and D.C. overlapping currents.

An inductor as shown in FIG. 7 was prepared by using two 'U' shaped iron cores made of a soft magnetic material. The material of the iron cores 71 and 71' are a soft ferrite having characteristics as shown in FIG. 11. The permanent magnet for biasing magnetic field was prepared by dividing into 16 sections which are of a square shape of 2.5 mm × 2.5 mm, and there were used a rare earth element-cobalt magnet having the characteristics, such as area of a magnetic pole of 10mm × 10mm, a thickness of 0.8mm, residual magnetic flux density Br=6000 gauss, and coercive force Hc-6000 oersted. Those 16 discrete magnet pieces 73 were placed in a gap having an extent of 0.8mm in dimension, with the magnetizing directions thereof being arranged in side-by-side relation and the bonded in position by using an epoxy-base adhesive. A copper wire having a diameter of 0.65 and coated with polyester was wound therearound 300 turns. An adjusting piece 75 of a wedge shape shown in FIG. 8 was prepared by using the material the same as that of the 'U' shaped iron cores 71 and 71'. The size of the wedge-shaped adjusting piece 75 is shown in FIG. 8. When the adjusting piece 75 of a wedge shape is moved to a position (A) as shown in FIG. 7, the relationship between the D.C. current Idc ampere flowing through the coil 74 and the inductance LmH will be such as is shown in FIG. 13(A). On the other hand, when the wedge-shaped adjusting piece 75 is moved to a position B in FIG. 7, the relationship between D.C. current and inductance will be such as is shown in FIG. 13(B).

What is claimed is:
1. An inductor device comprising:
   a magnetic circuit made of soft magnetic material having end faces defining a gap in at least one position in said circuit;
   coil means wound around a portion of said magnetic circuit having terminals connected in series with a power source and a load; and
   a plurality of permanent magnet pieces insulated one from the other, disposed in said gap between said end faces, said permanent magnet pieces being substantially disposed in a common plane.
2. An inductor device according to claim 1, wherein said plurality of permanent magnet pieces are rare earth-cobalt magnets.
3. An inductor device according to claim 1, wherein said plurality of permanent magnet pieces are secured to one of said end faces defining said gap.
4. An inductor device according to claim 1, wherein said plurality of permanent magnet pieces are disposed with the polarity axes thereof aligned in a substantially parallel relationship.
5. An inductor device comprising:
   a magnetic circuit comprising a first iron core made of soft magnetic material having at least two legs, and a second iron core made of soft magnetic material having at least two legs, said legs of said second iron core having end faces which oppose end faces of the legs of said first iron core, and at least one air gap formed between the end faces of the first and the second iron cores;
   coil means wound around a portion of said magnetic circuit having terminals connected in series with a power source and a load; and
   a plurality of rare earth-cobalt magnet pieces insulated one from the other, disposed in said at least one air gap between said end faces, said permanent magnet pieces being substantially disposed in a common plane.

* * * * *